United States Patent Office 2,883,395
Patented Apr. 21, 1959

2,883,395

EPOXY - SUBSTITUTED ORGANOSILICON COMPOUNDS AND METHOD FOR PREPARING THE SAME

Dow A. Rogers, Jr., Wilkins Township, Allegheny County, and Daniel W. Lewis, Pittsburgh, Pa., assignors to Westinghouse Electric Corporation, East Pittsburgh, Pa., a corporation of Pennsylvania No Drawing. Application September 14, 1956
Serial No. 609,808

4 Claims. (Cl. 260—348)

The present invention relates to organosilicon compounds and has particular reference to a new class of compounds comprising epoxy-substituted organosilicon compounds, to their preparation, and to their conversion to useful polymeric products.

Organosilicon compounds are used quite extensively in the electrical industry, particularly as insulating materials for various types of electrical apparatus and equipment. The use of such compounds as insulating materials is desirable due to their high thermal stability characteristics.

Epoxy resins, also known as glycidyl polyethers, also are used as insulating materials in the electrical industry, primarily because of their excellent chemical resistant characteristics, their excellent adhesive properties, and their low polymerization shrinkage characteristics.

An object of the present invention is to provide a new class of compounds comprising epoxy-substituted organosilicon compounds which are convertible to thermally stable thermosetting polymers having low shrinkage characteristics.

It is another object of the present invention to provide epoxy-substituted organosilicon compounds having a disilylphenylene group.

A further object of the present invention is to provide a process for preparing epoxy-substituted organosilicon compounds containing a disilylphenylene group.

Other and further objects of the invention will, in part, be obvious and will, in part, appear hereinafter.

In accordance with the present invention and in the attainment of the foregoing objects, there are provided organosilicon compounds having the disilylphenylene structural unit

with one epoxy-substituted radical attached to each silicon atom of such unit through an oxygen atom and in which the remaining valences of silicon are satisfied by monovalent hydrocarbon radicals.

More specifically, the present invention provides organosilicon compounds having the general formula

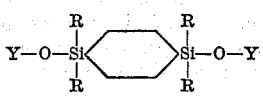

wherein R represents a monovalent hydrocarbon radical and Y represents a monovalent epoxy-substituted aliphatic radical. The novel epoxy-substituted organosilicon compounds provided by this invention may be prepared by reacting certain organosilicon monomers containing a disilylphenylene group with certain epoxy-substituted alkanols, halo-alkanes, and the like, to be described more fully hereinbelow.

The organosilicon monomers which may be used in preparing the compounds of this invention include those monomers containing a disilylphenylene group and comprise compounds having the general formula (1) 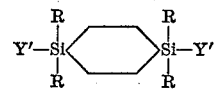

wherein R represents a monovalent hydrocarbon radical and Y' represents a reactive monovalent group selected from the group consisting of hydroxy, alkoxy, aryloxy, alkenoxy, halogen, amino, and —OM groups wherein M is an alkali metal.

The monovalent hydrocarbon radicals represented by R in the above formulae may be aliphatic, aromatic, saturated, or unsaturated and include such radicals as methyl, ethyl, propyl, isopropyl, benzyl, phenyl, vinyl, allyl, vinyl phenyl, and the like.

When Y' in the above formula is an alkoxy group, the alkyl radical thereof may be either primary, secondary or tertiary, for example, methyl, ethyl, propyl, butyl, isopropyl, isobutyl, secondary butyl, tertiary butyl, hexyl, and the like. When Y' is an aryloxy group, the aryl radical therein may be a phenyl radical or a substituted phenyl radical. Y' may be a halogen such as chlorine or fluorine or an amino radical. It is preferred to use those materials in which the hydrolyzable groups comprise alkoxy groups of a primary alkyl radical having from 1 to 8 carbon atoms.

An organosilicon monomer, which has been found to be particularly suitable for use in preparing the epoxy-substituted organosilicon compounds of this invention, is 1,4 bis-(ethoxydimethylsilyl) benzene. This alkoxylated silyl monomer may be prepared conveniently by a one-step process indicated by the following equation:

$$\text{p-C}_6\text{H}_4\text{Br}_2 + 2\text{Mg} + 2(\text{CH}_3)_2\text{Si}(\text{OC}_2\text{H}_5)_2 \longrightarrow$$

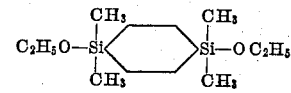

The following is a specific example of one convenient method for preparing this monomer.

*Example I*

In a 5 liter, 3-neck flask fitted with a stirrer, condenser, and dropping funnel there is warmed 50 ml. of a dry ether solution containing 25 grams of paradibromobenzene and 292 grams of magnesium. Into the warmed ether solution there is introduced 1155 grams of paradibromobenzene and 1480 grams of diethoxydimethylsilane dissolved in 1500 ml. of dry ether, the addition being made at a rate as to maintain gentle reflux of the resultant mixture. The salts which precipitate are removed by filtration, and the filtrate is distilled. 565 grams of crude 1,4 bis-(ethoxydimethylsilyl) benzene are obtained. On redistillation relatively pure 1,4 bis-(ethoxydimethylsilyl)benzene is obtained having the following constants: B.P. 123°–125° C./3.5 mm.; $D^{25}$ 0.9411; $N_D^{25}$ 1.4787. This product is readily convertible, on hydrolysis, to solid 1,4 bis-(hydroxydimethylsilyl) benzene.

In preparing the epoxy-substituted organosilicon compounds of this invention, organosilicon monomers of the character described above are reacted with any of the following compounds: (1) epoxy-substituted alkanols containing from 3 to 12 carbon atoms per molecule such as glycidol; 1,2-epoxy butanol; 1,2-epoxy pentanol; (2) epoxy-substituted halo-alkanes containing from 3 to 12 carbon atoms per molecule such as epichlorohydrin, epibromohydrin, 1,2-epoxy-4 chlorobutane; and (3) compounds of the formula (2)
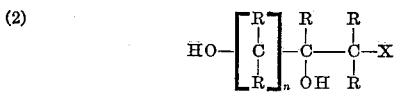

or (3)
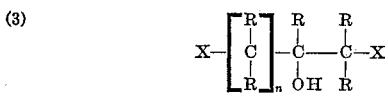

wherein R represents hydrogen or monovalent hydrocarbon radicals, X represents a halogen atom, and $n$ is an integer having a value of from 1 to 7 inclusive. These compounds, after reaction with the organosilicon monomers, undergo dehydrohalogenation with the resultant formation of an epoxy group

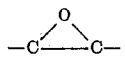

In preparing the compounds of this invention organic solvents such as toluene or benzene may be employed. The reaction is generally carried out with heating, and if desired, in the presence of a catalyst. In most cases fractional distillation is the most convenient method for recovering the desired product from the reaction mixture, although other applicable methods may be used, if desired.

It has been found when it is desired to react a monomer of the type represented by Formula 1 above with a compound of the type represented by Formula 2, that best results are obtained when Y' in Formula 1 is an ethoxy group. Reaction will occur when Y' is an OH group if specific provision is made to carry out the reaction under pressure and at relatively high temperatures, but it will not be as complete as when ethoxy groups are employed.

The epoxy-substituted organosilicon monomers of this invention, when treated with certain catalytic materials such as primary and secondary amines, polymerize through the epoxy groups to form useful polymeric products. They also may be polymerized in this manner with other types of epoxy containing materials such as ethylene oxide, epoxy ethers, such as diglycidyl ether and glycidyl ethers of polyhydric phenols obtained by reacting, for example, a polyhydric phenol such as bisphenol "A" with an excess of a halogen-containing epoxide such as epichlorohydrin.

To indicate even more fully the advantages and capabilities of the present invention the following specific examples are set forth to illustrate the preparation of the epoxy-substituted organosilicon monomers herein described.

*Example II*

Into a 250 ml., 3-neck flask equipped with agitator, inert gas tube, and condenser arranged for distillation, there are charged 69 grams (2 mols) of glycidol and 131 grams (1 mol) of 1,4 bis-(ethoxydimethylsilyl) benzene. The resultant mixture is agitated and carbon dioxide is passed through the mixture at a rate of 0.1 liter per minute. The mixture is heated to 50° C. at which temperature 0.2 gram of potassium hydroxide is added to the mixture. Heating is continued at atmospheric pressure up to 120° C. until a total of 40 ml. of ethyl alcohol is collected. Vacuum is then applied and the reaction mixture is vacuum stripped to 145° C. at 12 mm. Hg pressure. The resulting 1,4 bis-(2,3-epoxypropoxydimethylsilyl) benzene product is a viscous light amber liquid. This product may be used as a casting, impregnating, or laminating resin. It may be copolymerized to about 125° C. with an amine catalyst and with a reactive epoxy resin such as the reaction product of bis-phenol "A" and epichlorohydrin to yield a hard, amber colored resin.

*Example III*

An equally useful product is obtained by repeating Example II but using instead of the reactants therein described, one mol of the disodium salt of 1,4-bis-(ethoxydimethylsilyl) benzene

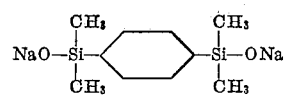

and 2 mols of 2-propanol-1,3-dichlorohydrin

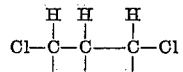

*Example IV*

Into a 3-neck flask equipped with agitator, thermometer, and distillation apparatus there is charged 282 grams (1 mol) of 1,4 bis-(ethoxydimethylsilyl) benzene and 221 grams (2 mols) of glycerol alpha monochlorohydrin. The mixture is thoroughly stirred and heated to a temperature of 150° C. during a period of approximately two hours at the end of which time about 85% of the theoretical amount of ethyl alcohol will have been removed. To the resulting product there is added 900 grams of 1,4 dioxane and 380 grams of sodium aluminate. The resultant mixture is refluxed for eight hours, filtered, and excess dioxane is distilled off. The filtrate then is vacuum stripped to a temperature of 160° C. at an absolute pressure of 18 to 20 mm. Hg. The product obtained is 1,4 bis-(2,3-epoxypropoxydimethylsilyl) benzene. This product may be used as a laminating, casting, or impregnating resin.

*Example V*

Into a flask equipped with agitator, thermometer, and distillation apparatus there are charged 202 parts of 1,4 bis-(hydroxydimethylsilyl) benzene, 827 parts of epichlorohydrin, and 4.5 parts of water. Thereafter, 12 parts of sodium hydroxide is added and the resultant mixture is heated to about 80° C. at which temperature the reaction becomes exothermic. When the exothermic reaction has ceased and the temperature has fallen to about 97° C., a second addition of sodium hydroxide is made. This consists of about 5 portions of 13 parts sodium hydroxide each. Thereafter, excess epichlorohydrin is removed by vacuum distillation. The residue is cooled to about 90° C. and 15 parts of benzene is added. Cooling precipitates the salt, which is washed with an additional 15 parts of benzene. The two solutions are then combined and vacuum distilled to a temperature of 175° C. at a pressure of 25 mm. of mercury. The resulting product is 1,4 bis-(2,3-epoxypropoxydimethylsilyl) benzene. This product is suitable for use as a casting, laminating, or impregnating resin. The product can also be polymerized alone or with another compound such as an epoxy resin to form a product suitable for use as insulation on electrical apparatus.

While the present invention has been described with reference to what is at present considered to be a preferred embodiment thereof, it will be understood, of course, that certain changes, substitutions, modifications and the like may be made therein without departing from its true scope.

We claim as our invention:

1. 1,4-bis-(2,3-epoxypropoxydimethylsilyl) benzene.
2. A compound having the structural formula

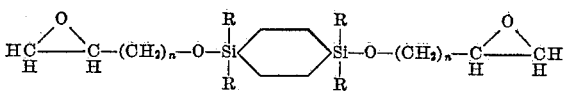

in which R represents monovalent hydrocarbon radicals and $n$ is an integer having a value of from 1 to 3 inclusive.

3. A compound having the structural formula

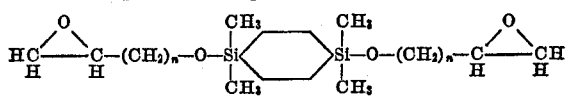

in which $n$ is an integer having a value of from 1 to 3 inclusive.

4. The process which comprises admixing and heating to a temperature up to about 150° C. in the presence of a catalyst selected from the group consisting of sodium hydroxide and potassium hydroxide (1) an organosilicon monomer having the general formula

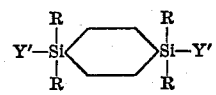

wherein R represents a monovalent hydrocarbon radical and Y' represents a reactive monovalent group selected from the group consisting of hydroxy, alkoxy, aryloxy, alkenoxy, halogen, amino, and —OM groups wherein M is an alkali metal, with (2) a compound having the general formula

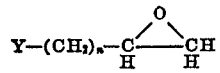

wherein Y represents a reactive monovalent group selected from the group consisting of hydroxy and halogen groups, and $n$ is an integer having a value of from 1 to 3, said compounds (1) and (2) reacting through groups Y' and Y respectively to yield an epoxylated organosilicon compound.

References Cited in the file of this patent
UNITED STATES PATENTS

| | | |
|---|---|---|
| 2,561,429 | Sveda | July 24, 1951 |
| 2,695,276 | Hatcher | Nov. 23, 1954 |